(12) United States Patent
Kersten

(10) Patent No.: US 7,258,180 B2
(45) Date of Patent: Aug. 21, 2007

(54) ROTARY HAMMERDRILL BIT

(75) Inventor: Heinrich Kersten, Verden (DE)

(73) Assignee: Illinois Tool Works Inc., Glenview, IL (US)

( * ) Notice: Subject to any disclaimer, the term of this patent is extended or adjusted under 35 U.S.C. 154(b) by 281 days.

(21) Appl. No.: 10/978,463

(22) Filed: Nov. 2, 2004

(65) Prior Publication Data

US 2005/0092528 A1 May 5, 2005

(30) Foreign Application Priority Data

Nov. 3, 2003 (DE) ................. 103 51 183

(51) Int. Cl.
*E21B 10/36* (2006.01)
(52) U.S. Cl. .......... 175/415; 175/420; 175/420.1
(58) Field of Classification Search .......... 175/420, 175/420.1, 415
See application file for complete search history.

(56) References Cited

U.S. PATENT DOCUMENTS

| | | | | |
|---|---|---|---|---|
| 4,165,790 | A * | 8/1979 | Emmerich | 175/420.1 |
| 4,716,979 | A | 1/1988 | Bradley | |
| 4,765,419 | A * | 8/1988 | Scholz et al. | 175/415 |
| 5,224,560 | A | 7/1993 | Fernandez | |
| 5,265,688 | A * | 11/1993 | Rumpp et al. | 175/394 |
| 5,482,124 | A * | 1/1996 | Haussmann et al. | 175/415 |
| 5,836,410 | A * | 11/1998 | Kleine | 175/415 |
| 6,026,918 | A * | 2/2000 | Briese | 175/414 |
| 6,032,750 | A | 3/2000 | Precht | |
| 6,283,232 | B1 * | 9/2001 | Batliner et al. | 175/415 |
| 6,446,741 | B1 * | 9/2002 | Kersten et al. | 175/428 |
| 6,588,519 | B2 * | 7/2003 | Knoller | 175/420.1 |
| 7,137,461 | B2 * | 11/2006 | Meierhofer | 175/323 |

FOREIGN PATENT DOCUMENTS

| | | |
|---|---|---|
| DE | 24 59 283 | 6/1975 |
| DE | 32 25 050 A1 | 1/1984 |
| DE | 88 14 613.8 | 3/1989 |
| DE | 38 25 107 A1 | 1/1990 |
| DE | 43 01 191 A1 | 7/1994 |
| DE | 43 03 590 A1 | 8/1994 |
| DE | 43 41 054 A1 | 6/1995 |
| DE | 198 41 978 A1 | 3/2000 |
| EP | 0 281 997 A1 | 9/1988 |
| EP | 0 322 565 A1 | 7/1989 |
| EP | 0 452 255 A2 | 10/1991 |

(Continued)

*Primary Examiner*—Jennifer H Gay
(74) *Attorney, Agent, or Firm*—Lowe, Hauptman & Berner, LLP

(57) ABSTRACT

A rotary hammerdrill bit for use with a percussion drilling device or a hammer drilling device, with a shank and a drill head attached to or configured on the shank, wherein a front side pointing in the advance direction of the drill head has a main cutting plate forming a main cutting axis. The main cutting plate extends over the diameter of the drill head and has a tip or tip-edge lying in the longitudinal axis of the drill bit and forms drill blades that are substantially roof-shaped and are inclined radially from the tip or tip-edge. The front side of the drill head has at least one pair of cutting pins, wherein the cutting pins are arranged on the drill head in essentially the same radial positions.

11 Claims, 5 Drawing Sheets

FOREIGN PATENT DOCUMENTS

| | | |
|---|---|---|
| EP | 0 778 391 A | 6/1997 |
| EP | 0 790 092 A | 8/1997 |
| EP | 0 824 626 | 2/1998 |
| EP | 0 943 780 A | 9/1999 |
| EP | 1 024 246 A | 8/2000 |
| EP | 1 273 372 A1 | 1/2003 |
| GB | 832 238 | 4/1960 |

* cited by examiner

ROTARY HAMMERDRILL BIT

RELATED APPLICATIONS

The present application is based on, and claims priority from, German Application Number 103 51 183.0, filed Nov. 3, 2003, the disclosure of which is hereby incorporated by reference herein in its entirety.

FIELD OF THE INVENTION

The present invention relates to a rotary hammerdrill bit for use with a percussion drilling device or hammer drilling device.

An essential criterion for the configuration of drill bits of the type in question is the drill progress per time unit achievable with such a rotary hammerdrill bit, the drill speed, in particular in hammer drill usage for example in concrete or steel-reinforced concrete, but also in other wall work, solid rock or the like.

BACKGROUND OF THE INVENTION

A prior art rotary hammerdrill bit for use with a percussion or hammer drilling device (DE 38 25 107 C2) has a main cutting plate that projects over the diameter of the drill head by a minimal amount. Cutting pins are arranged on a diameter on both sides of the main cutting plate, and thus are positioned in the same way relative to each drill blade of the main cutting plate. Both drill blades of the main cutting plate have the same completely concave contour in normal projection to the plate plane. The free front ends of the cutting pins serve to surface chiseling of the drill hole base, so that each following drill blade of the main cutting plate can operate more effectively.

Quiet operation and adhering to precise drill geometry has already been known to be problematic with the prior art rotary hammerdrill bit. This may have something to do with the fully concave trajectory of both drill blades of the main cutting plate.

It has already been proposed to design a rotary hammerdrill bit asymmetrically with cutting pins which are arranged on both sides of a main cutting plate substantially symmetrically at an angle of less than 90° of the main cutting axis defined by the main cutting plate (EP 0 943 780 A2). Quiet operation and precise drill geometry are achieved here in a better way due to the fact that the drill blades of the main cutting plate are extending substantially roof-shaped at an incline radially from the tip. In contrast to the above discussed prior art there is no concave contour of the drill blades of the main cutting plate.

The cutting pins of above mentioned prior art (EP 0 943 780 A2) are arranged on the drill head in the same essentially radial positions with the rotation surfaces defined by those cutting pins lying slightly below the rotation surface defined by the drill blades as such as seen in the advance direction of the drill bit.

A problem with above described further prior art, however, is the power necessary to achieve a specific drill speed. The two drill blades of the main cutting plate are contacting the concrete in full length and therefore need the highest possible torque. This is only slightly reduced by the fact that in percussion drilling and hammer drilling the movement of the drill head in the advance direction leads to a contact of the cutting pins with the concrete in the drill hole at persistently varying angle positions.

Further prior art (EP 0 824 626 B1) shows a drilling tool similar to the drilling tool discussed above but with secondary cutting plates instead of the cutting pins. Here the length of the main cutting plate is supplemented by the lengths of the secondary cutting plates with the result that the torque necessary for this drill bit is more or less the same as in the prior art mentioned before.

SUMMARY OF THE INVENTION

The problem to be solved with the present invention can be seen in achieving a high drill speed with a reduced torque necessary as well as with quiet operation and precise drill geometry.

This object is met with a drill bit for use with a percussion drilling device or a hammer drilling device, with a shank and a drill head attached to or configured on the shank, wherein on its front side pointing in the advance direction the drill head has a main cutting plate forming a main cutting axis, wherein the main cutting plate extends at least over the diameter of the drill head, has a tip or tip-edge lying in the longitudinal axis of the rock drill, and forms drill blades that are extending substantially roof-shaped at an incline radially from the tip or tip-edge, wherein on its front side pointing in the advance direction the drill head also has at least one pair of cutting pins, wherein the cutting pins are arranged on the drill head in essentially the same radial positions, and are arranged on both sides of the main cutting plate substantially symmetrically at a specific angle of less than 90° to the main cutting axis, wherein the drill blades each have a recess extending against the advance direction in the region of the rotation surface defined by the cutting pins, and wherein the rotation surface defined by the cutting pins projects in the advance direction beyond the rotation surface defined by the drill blades as such without considering the recesses, by approximately 0.1 mm to approximately 1.0 mm.

As the drill blades of the main cutting plate each have a recess extending against the advance direction in the region of the rotation surface defined by the cutting pins the torque necessary for a required drilling speed is substantially less than with drill blades extending over the full radial length from the tip to the outer perimeter of the drill head. This, however, is not leading to a reduced drilling effect, because the cutting pins project in the advance direction beyond the rotation surface defined by the drill blades as such. So the cutting pins are effective in chiseling the drill hole base at a drilling diameter where the drill blades leave a circular dam of concrete due to the position of the recesses. This circular dam of concrete is smashed by the hammer effect of the projecting cutting pins.

The measures given in the main claim are the result of extensive testing with an aim to optimise the relationship between drill speed, drill effectiveness and wear on the cutting pins and the drill blades.

In practice it has been proven that the asymmetrical (leading and lagging) arrangement of the cutting pins does not negatively influence the drill speed, but influences it even more positively, and also that the quiet running of the drill bit and the dimensional stability of the holes made with the drill bit are extraordinarily good.

Preferred embodiments and further developments of the rotary hammerdrill bit according to the present invention are described in the dependent claims.

BRIEF DESCRIPTION OF THE DRAWING

The invention will now be explained in greater detail herein below by means of a diagram illustrating several embodiments of a rotary hammerdrill bit according to the present invention, in which.

DETAILED DESCRIPTION OF THE INVENTION

Figure 1:
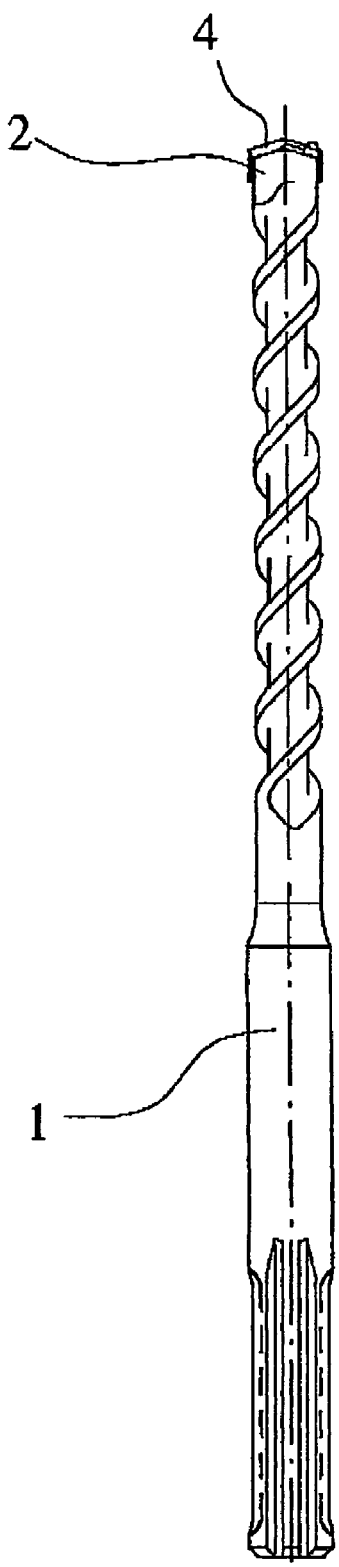
FIG. 1 shows an embodiment of rotary hammerdrill bit in general in a lateral elevation.

The rotary hammerdrill bit for percussion or hammer drilling has a shank 1 (FIG. 1) and a drill head 2 configured on the shank 1. It is not mandatory for the shank 1 and drill head 2 to be designed monobloc. For reasons of force transfer from the shank 1 to the drill head 2 a monobloc design of the drill head 2 on the shank 1 is the preferred norm.

Figure 2:
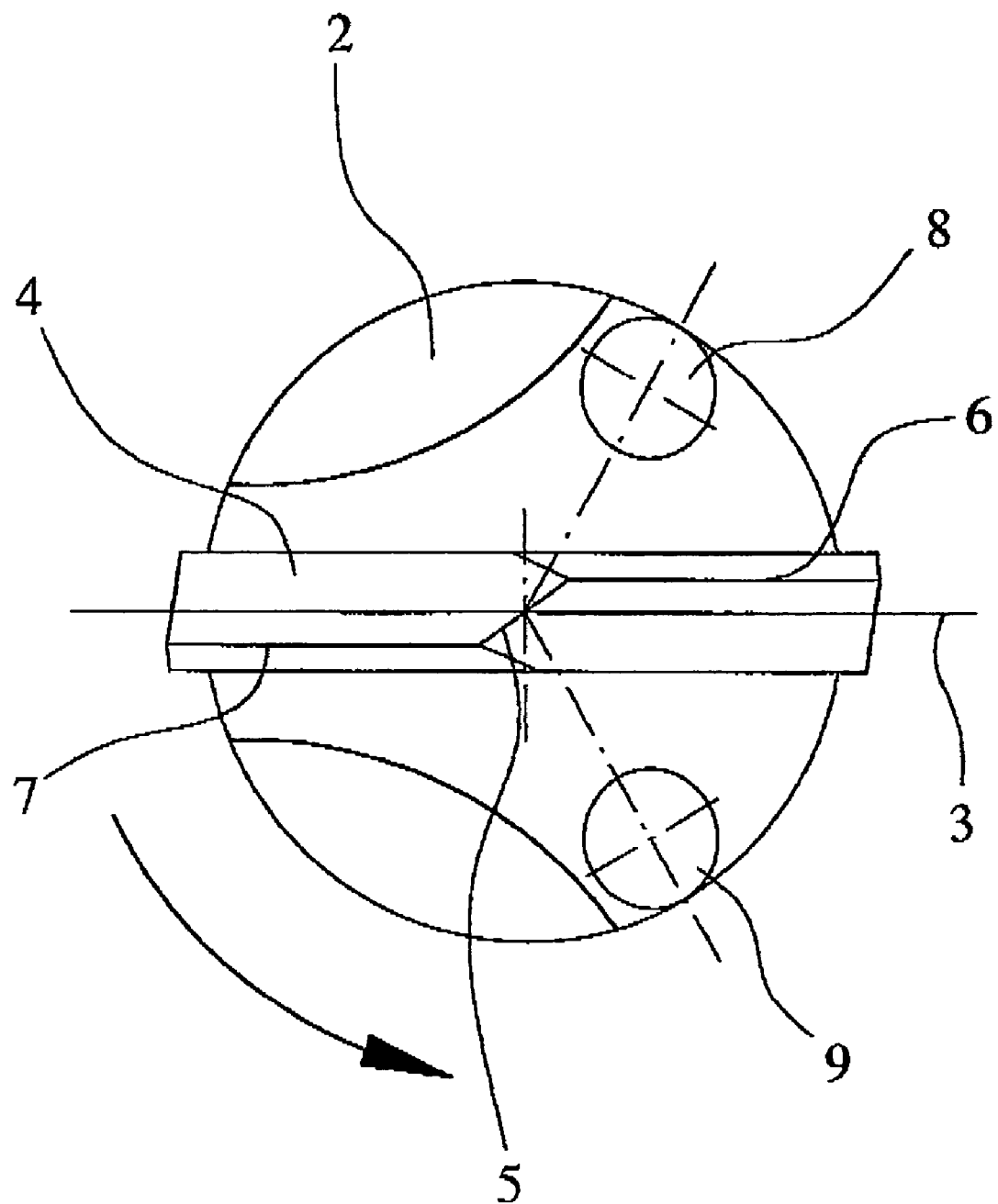
FIG. 2 shows the rotary hammerdrill bit of FIG. 1 in a plan view, i.e. a front elevation of the drill head against the advance direction, for explanation of one aspect of the invention.
Figure 3:
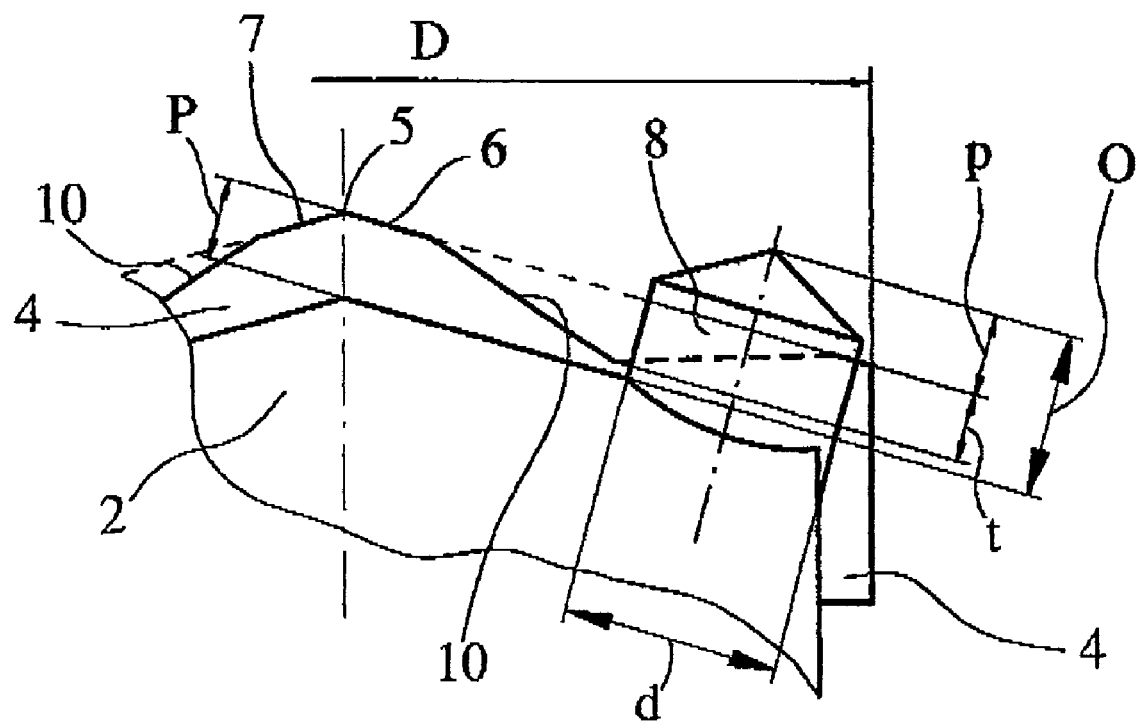
FIG. 3 shows a sectional view of the drill head in the area of the drill blade lying on the side of the cutting pins, the position of the cutting pins projected into the plane of the drill blade.

On its front side pointing in the advance direction the drill head 2 has a main cutting plate 4 forming a main cutting axis 3. The main cutting plate 4 extends to the side slightly beyond the outer diameter of the drill head 2, as shown in FIG. 2 and FIG. 3. The main cutting plate 4 has a tip edge 5 lying in the longitudinal axis of the rotary hammerdrill bit. Instead of a tip edge 5 a pointed tip can also be formed here.

The main cutting plate 4 generally forms drill blades 6, 7 running inclined out from the longitudinal axis. In fact the drill blades 6, 7 are extending substantially roof-shaped at an incline radially from the tip edge 5 towards the outer perimeter of the drill head 2 and, in this embodiment, slightly farther outwards.

In general, this drill head 2 has on its front side pointing in the advance direction a pair of cutting pins 8, 9 arranged on both sides of the main cutting plate 4. The free front ends of the cutting pins 8, 9 project over the rotation surface formed by the drill blades 6, 7 of the drill head 2 in the advance direction. The cutting pins 8, 9 are arranged on both sides of the main cutting plate 4 substantially symmetrically at a specific angle of less than 90° to the main cutting axis 3 and thus asymmetrically assigned to one drill blade 6. Both cutting pins 8, 9 are arranged on the drill head 2 in essentially the same radial positions. Therefore, both cutting pins 8, 9 together define a rotation surface. This rotation surface projects in the advance direction beyond the rotation surface defined by the drill blades 6, 7 as such.

Specifically, here the radii which join the cutting pins 8, 9 to the longitudinal axis of the drill head 2 lie at an angle of approximately 60° to the main cutting axis 3. If the direction of rotation of the drill bit indicated by the arrow in FIG. 2 is assumed, then the cutting pin 8 with respect to the right drill blade 6 is arranged leading and the cutting pin 9 is arranged lagging. The cutting pin 9 is also effective relative to the left drill blade 7, though even with another relative position. With respect to the angle of the cutting pins 8, 9 the specific angle is preferably between 20° and 75°, in particular between approximately 60° and approximately 70°.

With respect to dimension it has proven appropriate with customary diameters of drill bits, for example in a drill with a diameter of 16 mm (effective diameter of the main cutting plate 4), for the cutting pins 8, 9 to project beyond the rotation surface of the drill blades 6, 7 as such by approximately 0.1 mm to approximately 1.0 mm, preferably by approximately 0.2 to approximately 0.5 mm. In a specific embodiment we have 0.25 mm for diameter 16 mm, and 0.50 mm for diameter 20 mm, and 0.75 mm for diameter 30 mm.

Figure 5:
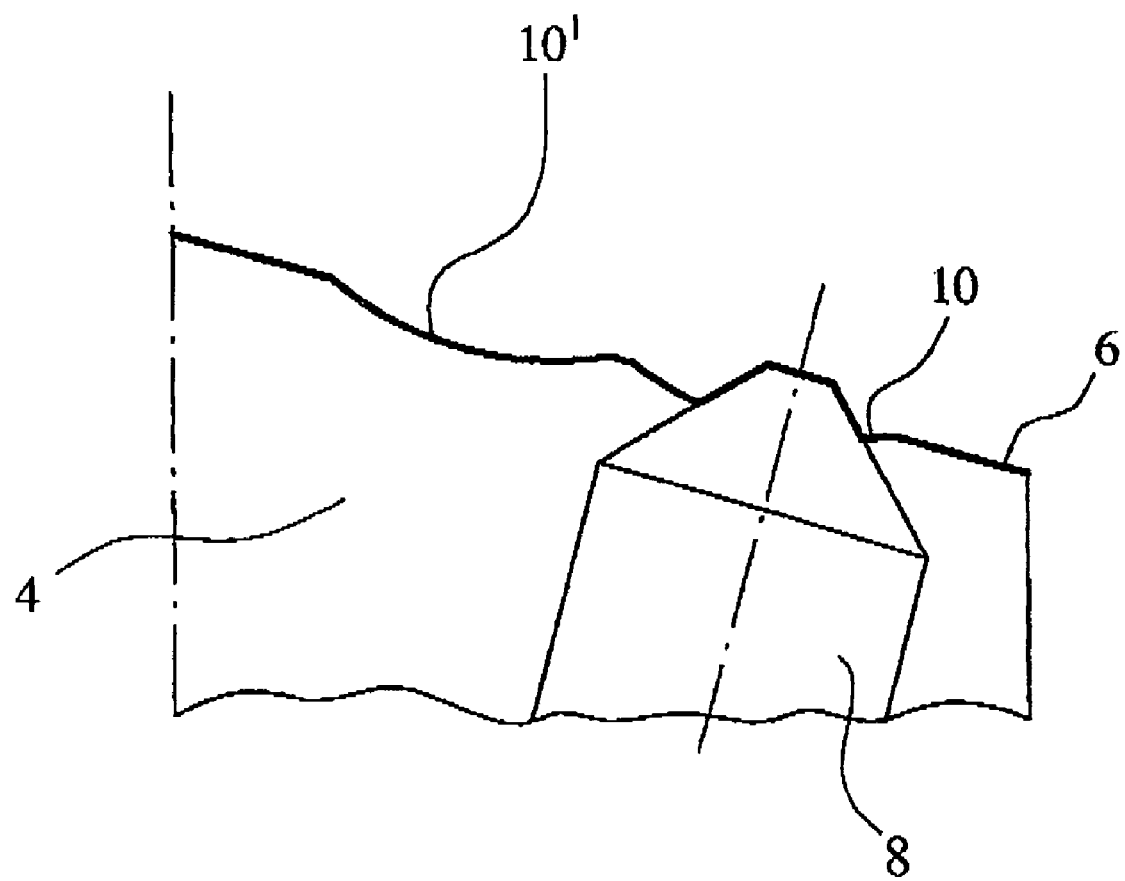
FIG. 5 shows a sectional view of the drill head according to a further embodiment of the invention on the side of the drill blade lying on the side of the cutting pins, again in a projection similar to FIG. 3, here with a main cutting plate according to FIG. 4.

The illustrated embodiment of FIG. 3 shows the cutting pins 8, 9 to be conical. With a greater load the cutting pins 6, 7 can be configured truncated as shown in FIG. 5. With respect to the surface chiseling of the drill hole base and for example chiselling out smaller concrete rocks and gravel truncated cutting pins 8, 9 are very effective.

It is recommended to make the cutting pins 8, 9 from a particularly impact-resistant metallic material, in particular a specific tungsten carbide. Further, materials for the main cutting plate 4 and the other parts of the drill bit as such are known from the prior art.

The illustrated embodiments show that the cutting pins 8, 9 are arranged in the radial outer third of the diameter of the drill head 2. The cutting pins 8, 9 absorb substantial axial machining forces and forward these to the drill head 2. The cutting blades 6, 7 of the main cutting plate 4 are thereby less susceptible to wear and breakage.

As can be seen in FIG. 3, to increase the drill speed, in the illustrated and in this respect preferred embodiment the cutting pins 8, 9 are not arranged axially parallel to the longitudinal axis of the shank 1 of the drill bit, but are arranged with their longitudinal axes approximately right-angled to the cutting blade 6.

The embodiment illustrated in FIG. 3 in this context shows an arrangement of the cutting pins 8, 9, where their jacket cuts the jacket of the drill head 2 at the upper edge. This takes into consideration that due to the geometric ratios sometimes only very small residual cross-sections remain for embedding the cutting pins 8, 9. It has been discovered that it actually suffices if the shanks of the cutting pins 8, 9 are not fully embedded at the edges, but have a recoiling receiving line on account of cutting the jacket surface of the drill head 2.

In the explanation of FIG. 2 it has been pointed out that the main cutting plate 4 projects over the drill head 2 slightly radially, so that the hole diameter, which can be made using this drill bit, is defined by the outer contour of the main cutting plate 4. But this corresponds to the usual practice with rotary hammerdrill bits which have embedded the main cutting plate 4 made of hard metal and other impact-resistant materials in the drill head 2.

FIG. 3 shows a first embodiment of the invention. First of all, the features which can be obtained from FIG. 2 and the description given above are realised here. In particular the rotation surface defined by the cutting pins 8, 9 projects in the advance direction beyond the rotation surface defined by the drill blades 6, 7 as such by approximately 0.1 mm to approximately 1.0 mm. However, in contrast to what is shown in FIG. 2, the drill blades 6, 7 each have a recess 10 extending against the advance direction in the region of the rotation surface defined by the cutting pins 8, 9. The projection of the cutting pins 8, 9 beyond the rotation surface of the drill blades 6, 7 as such is given without considering the recesses 10 (see dashed line in FIG. 3). The cutting pins 8, 9 take up the predominant axially acting components of the machining force and remove the dam of concrete material left of the working surface due to the position of the recesses 10. As explained above, the recesses 10 have the effect to reduce the effective length of the drill blades 6, 7 and thus reduce the torque necessary for achieving a specific drilling speed and result.

With correspondingly greater diameter of the drill head 2 it is possible to arrange several cutting pins in varying radial arrangement and/or different angle positions on the drill head 2.

The particularly preferred embodiment illustrated in section in FIG. 3 further shows that in spite of the edge-flush arrangement of the cutting pin 8 the radial outer point of the transition from the cylindrical jacket of the cutting pin 8 to the conical jacket surface of the cutting pin 8 is inside the rotation surface formed by the drill blades 6, 7 of the main cutting plate 4. Thus the drill hole diameter is still determined by the dimensions of the main cutting plate 4.

In FIG. 3 different dimensions are entered, namely the diameter D of the main cutting plate 4, the diameter d of the cutting pin 8, the projection P of the drill blade 6 relative to the drill head 2, the projection p of the cutting pin 8 relative to the drill blade 6, the depth t of the recess 10 and, of major significance, the overhang O of the cutting pin 8 relative to its anchoring in the drill head 2. The measurements d, P, p and O are interconnected and depending on one another and should be adjusted optimally.

Relevant details have been determined by testing. In the illustrated embodiment there are the following dimensions, however as a example:

D=25 mm
d=5 mm
P=2.5 mm
p=0.5 mm
t=0.75 mm-1.0 mm
O=3.0 mm

An optimal combination of configuration of the main cutting plate 4, arrangement and configuration of the cutting pins 8, 9 and choice of matching dimensions are appropriate. As described above, the preferred embodiment of the invention with frequently used diameters has the cutting pins 8, 9 to project by approximately 0.2 mm to approximately 0.5 mm beyond the rotation surface defined by the drill blades 6, 7 as such, as projected in the drawing of FIG. 3.

The rotary hammerdrill bit of the present invention may preferably be used with diameters of 15 to 45 mm with preferential diameters of 15 and 22 mm (80% of all sales).

Figure 4:
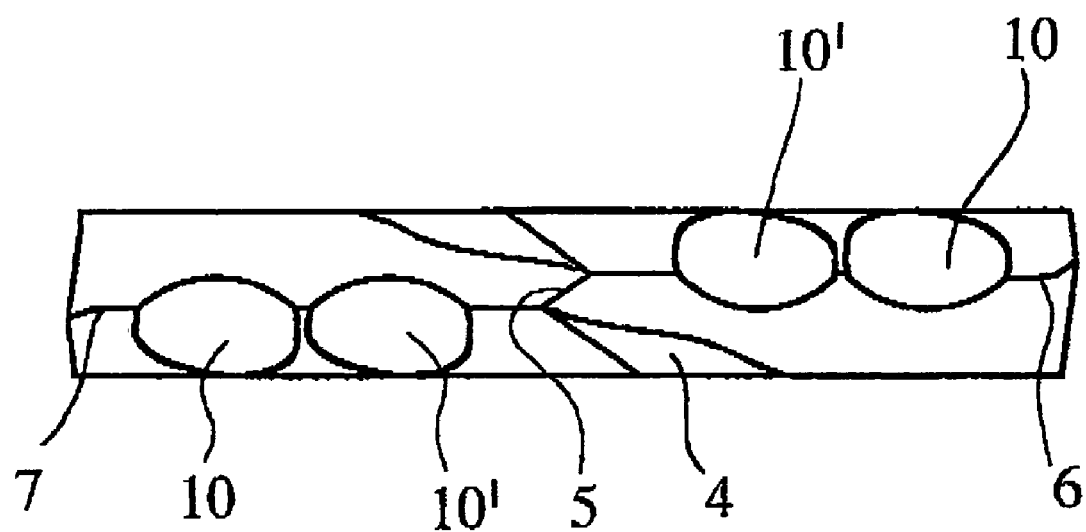
FIG. 4 shows a main cutting plate for a rotary hammerdrill bit according to a further embodiment of the invention shown in a top plan view.

FIG. 4 shows a further embodiment of the invention with a main cutting plate 4 that is commercially available. FIG. 4 shows this main cutting plate 4 which shows that the drill blades 6, 7 each have one further recess 10' outside the region of the rotation surface defined by the cutting pins 8, 9. So the main cutting plate 4 is generally point-symmetric relative to the longitudinal axis of the rotary hammerdrill bit as such.

FIG. 5 shows the position of the cutting pins 8, 9 projected into the plane of the drill blade 6 of a drill bit equipped with a main cutting plate 4 according to FIG. 4. It can be seen that the cutting pin 8 is centered relative to the recess 10 and another recess 10' is positioned outside the region of the rotation surface defined by the cutting pins 8, 9. This further recess 10' here and in the other drill blade 7 leads to a further reduction of the torque required in operation for this drill bit.

This arrangement has been revealed to be particularly suitable for the intended purpose. In contrast to the embodiment of FIG. 3 the greatest depth of the recess 10 is not offset from the longitudinal axis of the cutting pins 8, 9 but indeed centered to this axis as projected into the plane of the drill blades 6, 7.

The invention claimed is:

1. A rotary hammer drill bit for use with a percussion drilling device or a hammer drilling device, said hammer drill bit comprising:
   a shank;
   a drill head on the shank;
      the drill head having a front side pointing in an advance direction thereof, said front side having a main cutting plate forming a main cutting axis,
      wherein the main cutting plate extends beyond a diameter of the drill head, has a tip lying on a longitudinal axis of the drill bit, and includes a plurality of radially inclined drill blades extending outward from the tip along the main cutting axis; and
   at least one pair of cutting pins which are affanged on both sides of the main cutting plate, wherein
      a maximal radial extent of at least one of the pins from the longitudinal axis of the drill bit is smaller than a maximal radial extent of the main cutting plate from the longitudinal axis of the drill bit, and
      the pins are symmetrically arranged with respect to the main cutting plate at an angle between 20° and 75° with respect to said main cutting axis.

2. The drill bit as claimed in claim 1, wherein the angle is about from 60° to 70°.

3. The drill bit as claimed in claim 1, wherein a longitudinal axis of each of the cutting pins is oblique to the longitudinal axis of the drill bit.

4. A rotary hammer drill bit for use with a percussion drilling device or a hammer drilling device, said hammer drill bit comprising:
   a shank;
   a drill head configured to be connected to the shank;
   a front side pointing in an advance direction of the drill head, said front side has a main cutting plate forming a main cutting axis,
      wherein the main cutting plate extends over a diameter of the drill head and has a tip lying on a longitudinal axis of the drill bit, said main cutting plate includes a plurality of radially inclined drill blades extending outwardly from the tip along the main cutting axis;
   at least one pair of cutting pins located radially on the drill head and arranged symmetrically with respect to the main cutting plate at an angle between 20° and 75° with respect to said main cutting axis.

5. The drill bit as claimed in claim 4, wherein a longitudinal axis of each of the cutting pins is oblique to the longitudinal axis of the drill bit.

6. A drill head connectable to a shank of a rotary hammer drill bit for use with a percussion drilling device or a hammer drilling device, said drill head comprising:
   a front side pointing in an advance direction of the drill head, said front side has a main cutting plate forming a main cutting axis,
      wherein the main cutting plate extends over a diameter of the drill head and has a tip lying on a longitudinal axis of the drill head, said main cutting plate includes a plurality of radially inclined drill blades extending outwardly from the tip along the main cutting axis;

at least one pair of cutting pins located radially on the drill head and arranged symmetrically with respect to the main cutting plate at an angle less than 90° with respect to said main cutting axis.

7. The drill head as claimed in claim 6, wherein a maximal radial extent of at least one of the pins from the longitudinal axis of the drill head is smaller than a maximal radial extent of the main cutting plate from the longitudinal axis of the drill head.

8. The drill head as claimed in claim 7, wherein a drill hole diameter is determined by the maximum extent of the main cutting plate.

9. The drill head as claimed in claim 6, wherein a longitudinal axis of each of the cutting pins is oblique to the longitudinal axis of the drill head.

10. The drill head according to claim 6, wherein the cutting pins are truncated or conical.

11. The drill head as claimed in claim 6, wherein the cutting pins project in the advance direction beyond a rotation surface defined by the drill blades.

* * * * *